UNITED STATES PATENT OFFICE 2,602,055

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application September 25, 1950, Serial No. 186,682

7 Claims. (Cl. 252—335)

My invention provides an economical and rapid process for resolving petroleum emulsions of the water-in-oil type that are commonly referred to as "cut oil," "emulsified oil," "roily oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demusification under the conditions just mentioned are of significant value in moving impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

The demulsifying agent employed in the present process is a mixed ester salt of a monobasic acid and a polybasic acid. Two moles of the former and, more specifically, monocarboxy acids are employed whereas one mole of the latter is employed. The latter is a type in which two carboxyl radicals appear and one sulfo radical. The carboxyl radicals appears in ester form and the sulfo radical in salt form.

Such compounds are derived preferably by reaction between four types of reagents; (a) polypropylene glycol of a molecular weight sufficient to give water-insolubility and kerosene-solubility, generally being in the molecular weight range of 750 to approximately 3,000; (b) a dicarboxy compound selected from the class consisting of maleic acid (or anhydride), citraconic acid (or anhydride), and fumaric acid; (c) a low molal monocarboxy acid having less than 8 carbon atoms and preferably 3 or less; and (d) an alkali metal bisulfite such as sodium bisulfite or potassium bisulfite.

The preparation of the demulsifying agent involves substantially three steps: (a) The esterification of the polypropylene glycol mole for mole with the low molal monocarboxy acid, such as acetic acid, propionic acid, lactic acid, etc., to produce a fractional ester having one free hydroxyl radical; (b) esterification between two moles of the fractional ester obtained from polypropylene glycol and acetic acid, for example, and one mole of a dicarboxy compound such as maleic anhydride; and (c) reaction between such complete ester and a suitable alkali metal bisulfite such as sodium bisulfite.

Alternately one can esterify the glycol first with the dicarboxy acid or anhydride and then esterify with a monocarboxy acid, such as acetic acid. There is no choice between the two procedures.

More specifically then the present invention is concerned with a process for breaking petroleum emulsions of the water-in-oil type characterized by subjecting the emulsion to the action of a demulsifier including hydrophile synthetic products; said hydrophile synthetic products being characterized by the following formula:

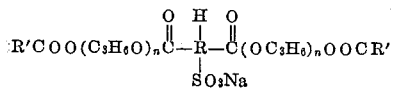

in which

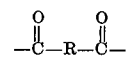

is the divalent radical of an unsaturated dicarboxy acid selected from the class consisting of maleic acid, fumaric acid, and citraconic acid; $n$ is a whole number varying from 12 to 80; and R'CO is the acyl radical of a low molal monocarboxy acid having less than 8 carbon atoms, and with the proviso that the polypropylene glycol prior to esterification be water-insoluble and kerosene-soluble.

In the above formula the alkali metal cation is shown as sodium which is the cheapest and most readily available. Needless to say, any other alkali metal cation, such as potassium, may be employed in the form of potassium bisulfite and is included in the hereto attached claims as the obvious chemical equivalent. Similarly ammonium bisulfite may be employed instead of sodium or potassium bisulfite. This applies also to the bisulfite of various organic bases provided, of course, that such bases prior to forming a sulfite are as basic as ammonia and that the sulfite is water-soluble. All these are the obvious functional equivalent of sodium bisulfite. The procedure is illustrated in the following example.

EXAMPLE 1

In a reaction flask there were placed 9 grams of glacial acetic acid, and 305 grams of propylene glycol 2025 (molal ratio of glycol to acid 1:1) along with one-half of 1% of toluene sulfonic acid. In this instance 1.5 grams were used. There was also added 50 cc. of xylene. Heat was applied and the mixture allowed to reflux for about 3½ hours. The maximum temperature during the reflux period was approximately 145° C. At the end of this time approximately 2½ cc. of water had been carried over to the phase-separating trap. At the end of this period there was still a slight acidity due to the catalyst and also perhaps a small amount of uncombined acetic acid. An additional ½% of toluene sulfonic acid was added along with 8 grams of maleic anhydride. Heat was applied again and the mixture refluxed for 4 hours. The maximum temperature during the second reflux period, as in the first case, was 145° C. The amount of water which distilled over in this instance was just a little bit more than one cc. At the end of the reaction period there was still a slight acidity due to the presence of the acid catalyst, possibly some uncombined maleic acid, or anhydride, and possibly some uncombined acetic acid. A small amount of 30% aqueous caustic soda was added until sufficient had been introduced to neutralize the free sulfonic acid radical and the free carboxyl acid radicals.

After this adjustment, 8 grams of powdered sodium bisulfite were added. Apparently enough water had been added along with the caustic soda to dissolve at least part of the sodium bisulfite so that further addition of water was not required. Needless to say, if no caustic soda solution was used to neutralize the acidity, then a little water should be added to dissolve at least part or all of the sodium bisulfite so as to give a saturated solution. The reaction mixture was stirred and heated for three hours. No effort was made to have any reflux take place during this stage of the reaction for the obvious reason that if water were removed and the sodium bisulfite were anhydrous there would be little or no opportunity for reaction. This was necessary also for the reason that sodium bisulfite begins to decompose at about 100° C. and this reaction obviously must be conducted at a suitable temperature until the sodium bisulfite has combined. Thereafter the xylene can be distilled over in the usual manner, removing any water with it and all the xylene can be removed by distillation, particularly vacuum distillation. The same procedure was followed in connection with a number of additional samples, all of which are illustrated in the following tables which gives the reactants, amounts employed, temperature of esterification, etc.

Table 1

| Ex. No. | M. W. of Polypropylene Glycol | Amt. Used (grs.) | Monocarboxy Acid | Amt. Used (grs.) | Xylene (ccm.) | Max. Esterification Temp. (°C.) | Esterification Time (hrs.) |
|---|---|---|---|---|---|---|---|
| 1 | 2,025 | 395 | Acetic | 9 | 50 | 145 | 3½ |
| 2 | 725 | 115 | ...do... | 9 | 45 | 143 | 3¼ |
| 3 | 1,025 | 155 | ...do... | 9 | 45 | 139 | 4 |
| 4 | 2,525 | 375 | ...do... | 9 | 60 | 140 | 4¼ |
| 5 | 1,525 | 230 | ...do... | 9 | 45 | 145 | 4¼ |
| 6 | 2,025 | 300 | ...do... | 9 | 50 | 143 | 4 |
| 7 | 725 | 115 | ...do... | 9 | 50 | 145 | 4¼ |
| 8 | 1,025 | 155 | ...do... | 9 | 45 | 143 | 3½ |
| 9 | 2,525 | 375 | ...do... | 9 | 45 | 143 | 3¼ |
| 10 | 1,525 | 230 | Propionic | 11.5 | 60 | 140 | 3¾ |
| 11 | 2,025 | 300 | ...do... | 11.5 | 55 | 141 | 4 |
| 12 | 725 | 115 | ...do... | 11.5 | 50 | 140 | 4½ |
| 13 | 1,025 | 155 | ...do... | 11.5 | 50 | 145 | 4½ |
| 14 | 2,525 | 375 | ...do... | 11.5 | 45 | 141 | 4 |
| 15 | 1,525 | 230 | ...do... | 11.5 | 60 | 141 | 3½ |
| 16 | 2,025 | 300 | ...do... | 11.5 | 50 | 140 | 3½ |
| 17 | 725 | 115 | ...do... | 11.5 | 55 | 141 | 4¾ |
| 18 | 1,025 | 155 | ...do... | 11.5 | 45 | 139 | 4½ |
| 19 | 2,525 | 375 | ...do... | 11.5 | 60 | 142 | 3 |
| 20 | 1,525 | 230 | ...do... | 11.5 | 55 | 141 | 4½ |

Table 2

| Ex. No. | Dicarboxy Reactant | Amt. Used (grs.) | Max. Esterification Temp. (°C.) | Esterification Time (hrs.) | Sodium Bisulfite (grs.) | Max. Reaction Temp. (°C.) | Reaction Time (hrs.) |
|---|---|---|---|---|---|---|---|
| 1 | Maleic Anhydride | 8 | 145 | 4 | 8 | 80-95 | 3 |
| 2 | ...do... | 8 | 140 | 3½ | 8 | 80-95 | 3¼ |
| 3 | ...do... | 8 | 144 | 3 | 8 | 80-95 | 4½ |
| 4 | ...do... | 8 | 143 | 3½ | 8 | 80-95 | 4 |
| 5 | ...do... | 8 | 140 | 4¼ | 8 | 80-95 | 4 |
| 6 | Citraconic Anhyd | 9 | 149 | 3 | 8 | 80-95 | 3¾ |
| 7 | ...do... | 9 | 141 | 4 | 8 | 80-95 | 3¾ |
| 8 | ...do... | 9 | 141 | 4 | 8 | 80-95 | 4½ |
| 9 | ...do... | 9 | 139 | 4¼ | 8 | 80-95 | 3½ |
| 10 | ...do... | 9 | 140 | 3¾ | 8 | 80-95 | 4 |
| 11 | Maleic Anhydride | 8 | 144 | 3¾ | 8 | 80-95 | 4½ |
| 12 | ...do... | 8 | 143 | 3½ | 8 | 80-95 | 3¾ |
| 13 | ...do... | 8 | 140 | 3½ | 8 | 80-95 | 4 |
| 14 | ...do... | 8 | 141 | 4 | 8 | 80-95 | 3¾ |
| 15 | ...do... | 8 | 144 | 4½ | 8 | 80-95 | 3½ |
| 16 | Citraconic Anhyd | 9 | 139 | 4¼ | 8 | 80-95 | 4½ |
| 17 | ...do... | 9 | 143 | 3½ | 8 | 80-95 | 3¼ |
| 18 | ...do... | 9 | 140 | 4¼ | 8 | 80-95 | 4 |
| 19 | ...do... | 9 | 142 | 4 | 8 | 80-95 | 3½ |
| 20 | ...do... | 9 | 144 | 4½ | 8 | 80-95 | 3¼ |

Polypropylene glycols are commercially available. Such polypropylene glycols are furnished in various molecular weight ranges. The water-insoluble, kerosene-soluble polypropylene glycols begin in the molecular weight range somewhere above 500, and more specifically, at about 700 or 750. The molecular weight was usually determined by the hydroxyl method. Such hydroxyl molecular weight is a fraction, sometimes a large major fraction, of the theoretical molecular weight based theoretically on the value one would expect to obtain by treating water or propylene glycol, for example, with propylene oxide. Needless to say, one does not obtain a single compound but a propylene glycol of a molecular weight ratio of 750 or 1,000 or 2,000 as the case may be and really represents a cogeneric mixture whose statistical average molecular weight is the one indicated. Reference in the table is, of course, to hydroxyl value molecular weight for the obvious reason that this is the basis for calculating the amount of reactants required.

In all instances a small amount of 30% caustic soda was used as in the more complete description of Example 1. Also a small amount of toluene sulfonic acid, approximately 1% of the weight of the glycol or slightly less, was used in the two esterification steps. About one-half of this amount was used in the first esterification step (with the monocarboxy acid), and an equal amount added during the second esterification step (with the dicarboxy reactant). A larger amount should not be used at any time because there may be decomposition of the glycol. The total amount can be added during the initial esterification if desired. Smaller amounts can be used, for instance, a total of ½ of 1% or ¾ of 1% based on the amount of glycol, provided, however, that the esterification time is extended somewhat.

One may use any one of a variety of monocarboxy acids, such as those previously noted, or higher acids of the aliphatic series, such as butyric or valeric. The acids may be cyclic as in the case of benzoic, cyclohexanoic and furoic. The acid may have the carbon chain interrupted by an oxygen atom as in the instance of betamethoxy propionic acid. The acids may be hydroxylated as in the case of hydroxyacetic acid or lactic acid. In any event, however, the acids must be free from any radical having 8 or more uninterrupted carbon atoms in a single group.

One need not prepare the ester in the manner described above but may use some other conventional procedure as, for example, the use of the acyl chloride instead of the acid, or by alcoholysis involving methyl or ethyl acetate, ethyl or methyl propionate, etc. One may also start with the acid itself, such as acetic acid or propionic acid and subject such acid to oxypropylation until the desired molecular weight is reached.

The products obtained are comparable to the initial glycol in appearance, etc., i. e., usually they are an amber color or at least of a slight straw color, and often somewhat thicker than the original glycol. This description, of course, applies to materials after the removal of the solvent, i. e., the xylene. For use as demulsifiers there is no need to remove the xylene and it may remain behind. Obviously other liquids than xylene may be used in esterification procedure. However, if the boiling point is any higher than xylene there is danger that decomposition may take place unless the amount of sulfonic acid is reduced. Other catalysts such as a small amount of dry hydrochloric acid can be used but it appears less desirable than the sulfonic acid. Needless to say, the caustic soda solution used neutralizes the sulfonic acid catalyst present.

The equipment used in esterification procedure is a resin pot of the kind described in U. S. Patent No. 2,499,370, dated March 7, 1950, to De Groote and Keiser. Any conventional equipment can be used, either on a small scale, pilot plant scale, or larger scale.

In the various examples preceding only one glycol has been used in these cases. Actually there is no reason why one may not use two different glycols, for instance, an equimolar mixture of two glycols, one for example having a molecular weight of 2000 and the other 3000, or one having a molecular weight of 1500 and the other 2500. Actually these glycols are cogeneric mixtures, at each selected molecular weight. If one does make a mixture of the kind here described actually three types of compounds will appear; one type in which both carboxyl radicals of the polycarboxy acid are joined with the higher glycol, one type where both carboxyls are joined with the lower molecular weight glycol, and one type where one carboxyl is united to a higher molecular weight glycol, and the other one to a lower molecular weight glycol.

Other variations are obviously possible by using different monocarboxy acids. For example, the same dicarboxy reactant can be used such as maleic anhydride united with different esters of the same glycol, for instance, acetic acid ester and propionic acid ester, or the different acids might be joined to glycols of different molecular weights.

The products so obtained are peculiar (a) insofar that there is not present any radical having 8 or more uninterrupted carbon atoms, and (b) the compounds are not particularly effective as surface-active agents in the ordinary sense due either to the large molecular size or the absence of a hydrophobe radical of the kind previously referred to, or for some other reason which is obscure. The chemical compounds herein employed as demulsifiers have molecular weights varying from more than 1000 up to several thousands, for instance, 5000, 6000, or 7000, and yet contain only one sulfo radical. Utility of such compounds for industrial uses is rather unusual. They are not effective emulsifying agents, but are valuable as an additive or a promoter of emulsions. These compounds also have hydrotropic property and serve as common solvents in the preparation of micellar solutions. It is to be noted that they are free from terminal carboxyl radicals and thus differ from reagents obtained, for example, by treating one mole of a high molal polypropylene glycol with 2 moles of a dicarboxy acid. It is probable these reagents, due to their peculiar structure and their peculiar solubility characteristics, will find utility in other fields of application now unknown.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the products herein specified as demulsifiers can be conveniently used without dilution. However, as previously noted, they may be diluted as desired with any suitable solvent. For instance, by mixing 75 parts of such derivative, for example, the product of Example 1 with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier.

Having thus described my invention what I claim as new and desire to secure by Letters Patent, is:

1. A process for breaking petroleum emulsions of the water-in-oil type characterized by subjecting the emulsion to the action of a demulsifier including hydrophile synthetic products; said hydrophile synthetic products being characterized by the following formula:

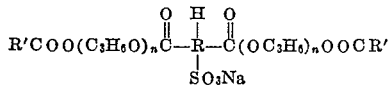

in which

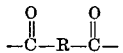

is the divalent radical of an unsaturated dicarboxy acid selected from the class consisting of maleic acid, fumaric acid, and citraconic acid; $n$ is a whole number varying from 12 to 80; and R'CO is the acyl radical of a low molal monocarboxy acid having less than 8 carbon atoms, and with the proviso that the corresponding polypropylene glycol of the formula

be water-insoluble and kerosene-soluble.

2. The process of claim 1 wherein the dicarboxy acid is maleic acid.

3. The process of claim 1 wherein the dicarboxy acid is maleic acid and the value of $n$ corresponds to a polypropylene glycol of approximately 700 molecular weight.

4. The process of claim 1 wherein the dicarboxy acid is maleic acid and the value of $n$ corresponds to a polypropylene glycol of approximately 1000 molecular weight.

5. The process of claim 1 wherein the dicarboxy acid is maleic acid and the value of $n$ corresponds to a polypropylene glycol of approximately 1500 molecular weight.

6. The process of claim 1 wherein the dicarboxy acid is maleic acid and the value of $n$ corresponds to a polypropylene glycol of approximately 2000 molecular weight.

7. The process of claim 1 wherein the dicarboxy acid is maleic acid and the value of $n$ corresponds to a polypropylene glycol of approximately 2500 molecular weight.

MELVIN DE GROOTE.

REFERENCES CITED

The following references are of record in the file of this patent:

UNITED STATES PATENTS

| Number | Name | Date |
|---|---|---|
| 2,072,085 | De Groote et al. | Mar. 2, 1937 |
| 2,184,794 | De Groote et al. | Dec. 26, 1939 |
| 2,301,609 | Bonnet | Nov. 10, 1942 |
| 2,305,067 | De Groote | Dec. 15, 1942 |
| 2,315,375 | Nawiasky et al. | Mar. 30, 1943 |
| 2,353,694 | De Groote et al. | July 18, 1944 |
| 2,514,399 | Kirkpatrick et al. | July 11, 1950 |